United States Patent [19]
Pease et al.

[11] 3,765,708
[45] Oct. 16, 1973

[54] TUBING UNION
[75] Inventors: George E. Pease, Renton; Egil R. Pettersen, Kent, both of Wash.
[73] Assignee: The Boeing Company, Seattle, Wash.
[22] Filed: Nov. 8, 1971
[21] Appl. No.: 196,664

[52] U.S. Cl............................. 285/382.2, 285/417
[51] Int. Cl................................................ F16l 13/14
[58] Field of Search................. 285/382.2, 384, 385, 285/417, 418, 372, 353

[56] References Cited
UNITED STATES PATENTS

| | | | |
|---|---|---|---|
| 3,149,860 | 9/1964 | Hullesy | 285/417 X |
| 1,186,813 | 6/1916 | McFerron | 285/417 X |
| 2,037,812 | 4/1936 | McKendrick | 285/382.2 X |
| 2,162,184 | 6/1939 | Snyder | 285/353 |
| 3,276,792 | 10/1966 | Dunton | 285/353 X |

FOREIGN PATENTS OR APPLICATIONS

| | | | |
|---|---|---|---|
| 635,266 | 3/1962 | Italy | 285/353 |
| 791,491 | 9/1935 | France | 285/383 |

*Primary Examiner*—Dave W. Arola
*Attorney*—Glenn Orlob

[57] ABSTRACT

A screw-together assembly for the permanent repair of defective tubing wherein a repair sleeve having an internally serrated surface, and its associated parts are slipped over the ends of the tubing to be joined and the sleeve centrally positioned over the juncture. By applying a pair of wrenches to the ends of the assembly, a pair of swaging collars within the assembly are brought together and through forces applied by a wedging action between complementally tapered slide surfaces of the swaging collars and the sleeve, as the two threaded bodies are screwed together, the repair sleeve is deformed by radial compression causing its inner serrated surface to deform the tubing surface and effect a permanent union of the tubing.

1 Claim, 3 Drawing Figures

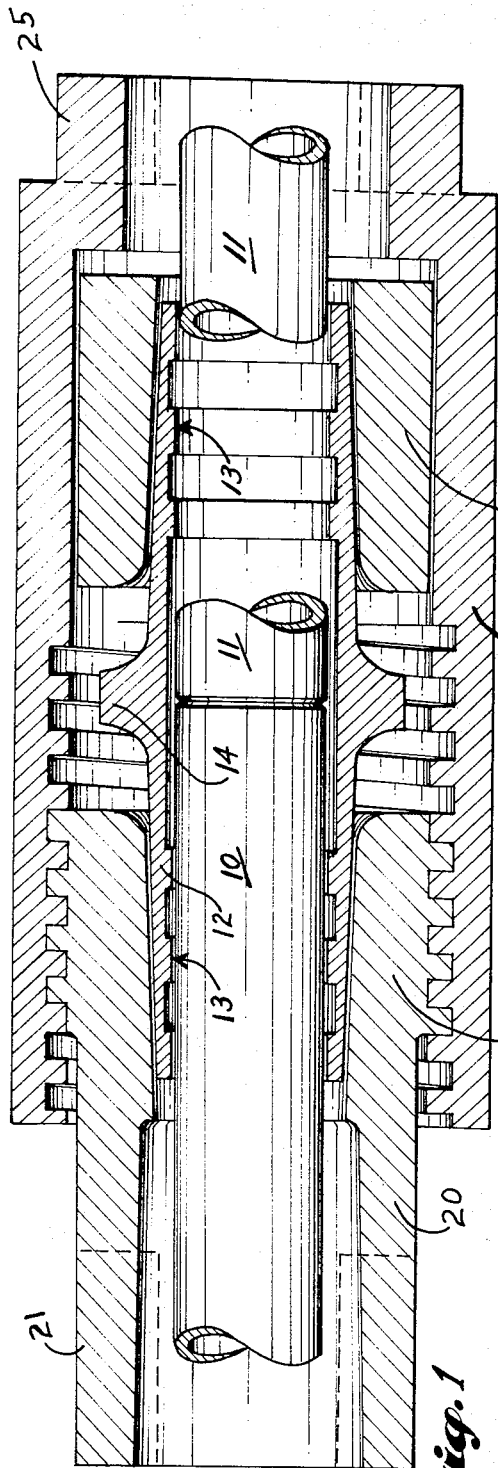
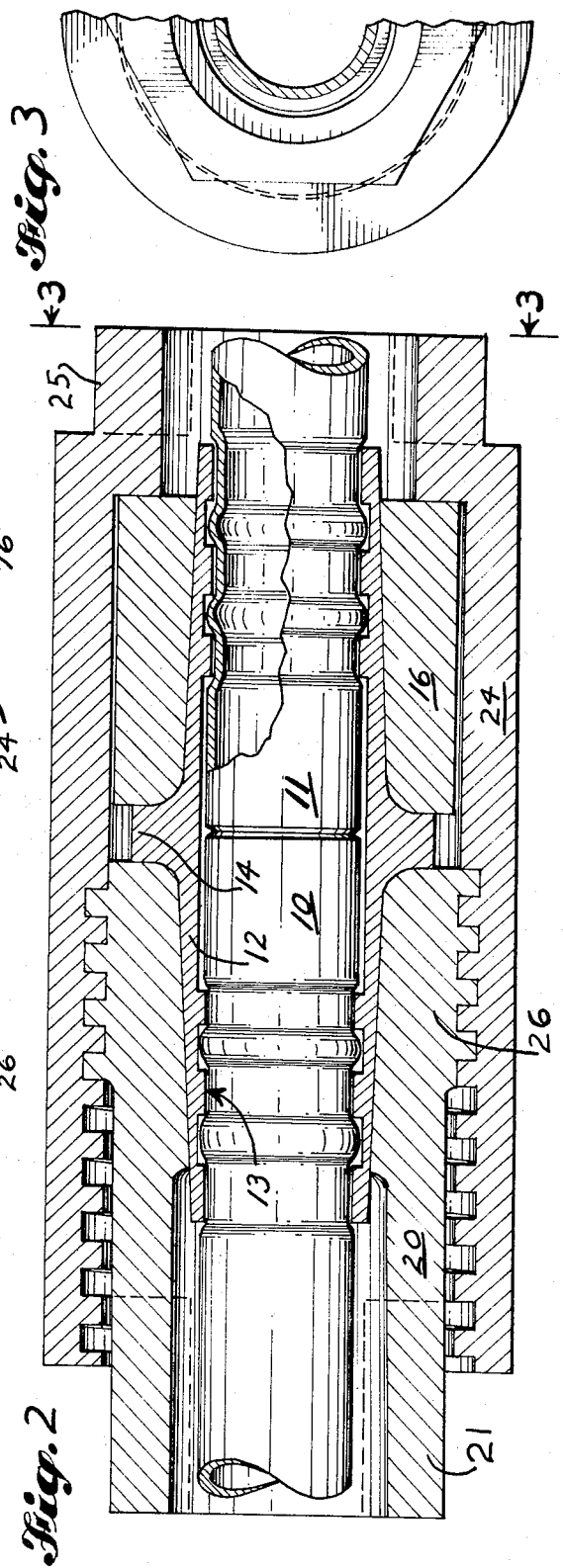
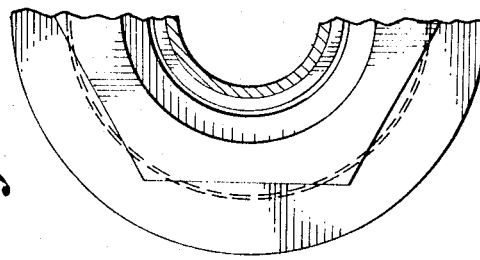

TUBING UNION

SUMMARY OF THE INVENTION

The invention relates to a screw-together tubing union having a swaged sleeve fitting for use in the repair of defective tubing. This union is used for the in situ permanent repair of broken hydraulic tubing and makes it possible to do field repairs with the only tools required being two wrenches. The union comprises a housing and an insert which are threadably engageable. The housing is internally threaded at one end and has both an internal shoulder and an external wrenching portion at the other end. The insert is externally threaded and has an internal swaging surface or swaging collar at one end and an external wrenching portion at the other end. Prior to a repair operation, the housing followed by a swaging collar is slipped over the end of one of the tubes and the insert is slipped over the end of the other tube. Then the repair sleeve is slipped over one of the tubes and the tubes aligned whereupon the insert is threaded loosely into the housing. The entire assembly is then positioned over the tubing junction area and the housing and insert tightly screwed together by wrenches thereby plastically deforming the repair sleeve onto the broken tube and effecting a permanent coupling for a high pressure aircraft hydraulic system of 3,000 – 6,000 psi.

One of the disadvantages of present known MS standard fitting joints is that they will not make a satisfactory leakproof joint with high tensile strength hard tubing used in aircraft hydraulic lines of 3,000 to 6,000 psi., because the cutting edge on the sleeve does not sufficiently penetrate the surface to provide the tensile strength and sealing required of the union assembly. To provide the necessary tensile strength, the serrations in the repair sleeve should be directed more to a square front tooth like form with a series of predetermined circumferential lands and grooves of trapezoidal cross-section in order to bend the tubing about an edge and deform it in addition to penetrating or cutting into the tubing wall. Further, swaged tube fittings that are known to make a satisfactory repair joint generally require expensive tools which are also so heavy and bulky that in situ repairs in the majority of cases cannot be made. Whereas, the present invention requires only a pair of wrenches. The amount of torque force required to tighten the tubing union for swaging the sleeve onto the tubing can be substantially decreased by the use of a dry film lubricant which also minimizes galling problems. Further, the torque force can be predetermined and controlled by the length and depth of the lands and grooves of the serrated inner surface of the repair sleeve, by the thickness of the wall of the sleeve, by the amount of interference, and by the degree of taper of the slide surfaces. The tubing union assembly material should be compatible with the tubing material to be repaired from the standpoint of galvanic corrosion.

Another disadvantage of the commonly used threadedly engageable tube fittings is that the type of threads used would not be satisfactory in applying sufficient power transmission to bring the pair of swaging collars together to deform the repair sleeve without galling the threads. Therefore, to eliminate galling and to achieve reasonable tightening torque levels, the type of threads used in the tube union of the present invention are square type threads or more preferably, buttress screw threads as more clearly described in the publication "Standard Buttress Screw Threads," ASA B1.9–1953, published by the American Society of Mechanical Engineers.

Another advantage of the present invention is that it provides a faster permanent repair of ruptured tubular lines than currently known repair methods using swaged-on flareless sleeves as shown in U.S. Pat. No. 3,498,648, issued Mar. 3, 1970, since it does not require the heavy and expensive tooling used with that type of fitting.

BRIEF DESCRIPTION OF THE DRAWINGS

FIG. 1 is an axial cross-section of the tubing union with the individual parts of the assembly drawn up in their fingertight position.

FIG. 2 is the cross-section of FIG. 1 after the tubing union has been wrench tightened until the swaged collars abut the external flange of the repair sleeve.

FIG. 3 is an end view, in partial section, taken from the right end of FIG. 2 in the direction indicated by 3—3 and shows the wrenching nut at the end thereof.

DESCRIPTION OF THE PREFERRED EMBODIMENT

FIG. 1 shows the round tube repair fitting or tube coupling assembly of the present invention with the individual parts of the assembly arranged in their expanded or loosely engaged position for joining the ends of axially aligned tubing in an abutment relation. As can be seen in FIG. 1, this abutment relation involves having the ends of the tubes 10 and 11 butted together in tight nesting engagement. A single swaged union can be used to repair short tube defects by cutting out and removing the defective section with a chipless cutter. Larger defects or tube bend defects would be repaired by removing a predetermined length of tubing which would include the damaged section and installing a new section of tubing of the length of the removed damaged section using two union assemblies aligned and tightened into position. Where a single swaged union is used, the broken or ruptured tube is repaired by severing the tube at the rupture and displacing the ends of the tube 10 and 11 out of axial alignment in order to initially slip the insert or male threaded member 20 over one end of tube 10 and the housing or female threaded body including the collar 16 are slipped over the end of the other tube 11. Then the sleeve 12 is slipped over the end of one of the tubes. The tubes are then realigned in an abutment relation and the sleeve positioned so that it is centered over the severed juncture. The two threaded bodies 20 and 24, having wrenching portions 21 and 25 respectively at their ends are then screwed together over the repair sleeve 12. The interior end portions of the sleeve 12 are provided with a series of circumferential serrations 13 the lands of which have an inside diameter that provides a sliding contact with the outside diameter of the tubes 10 and 11. The form profile, the depth, and the spacing of the serrations determine the tensile strength of the joint. These are critical factors in achieving maximum joint strength. Deformation of the tube over a sharp edge is a requirement. Simple penetration of the tube by a sharp serration does not produce the highest strength joint. The sleeve has an external flange 14 around its central portion and is externally tapered from the central portion with decreasing diameter towards the ends forming an external slide surface. One end of the male threaded member 20 forms a swaging collar which in combination with the swaging collar 16 forms a coupling having internally tapered surfaces that are complementary with the externally tapered slide surface of the sleeve 12 in that when the swaging collars are properly assembled to form the coupling, their internal surfaces decrease in diameter in the direction running axially outward from the center of the sleeve 12, forming internal slide surfaces. Initially, the swaging collars 26 and 16 are drawn up finger-tight over the sleeve end portions. Wrenches are then applied to the nut facings at the ends of the male threaded body 20 and the female threaded member 24. In this manner equal opposing forces are applied to the collars to urge their inner surfaces up the inclined outer surfaces of the sleeve which through the wedging action between the slide surfaces of the sleeve and collars, compresses the sleeve radially inward causing the serrations to deform the outer surface of the tubes 10 and 11 and thus effectively grip and interlock the tubes with the sleeve to effect a permanent pressure sealed joint. The assembly is tightened with a pair of wrenches until the collars are forced onto the sleeve and abut the stop formed by the external flange 14 about the center of the sleeve. The threaded engagement between the male member 20 and the female member 24 in combination with the wedging forces applied by the tapered slide surfaces of the sleeve and collars, effectively and permanently locks and seals the tube coupling assembly into position.

When the tubing is used in aircraft for the high pressure, 3,000 – 6,000 psi., hydraulic lines, it has to take a relatively high tensile loading tending to pull the joint apart. Therefore, in the serrations of the sleeve 12, the length of the lands and the depth of the grooves in the spaced series of circumferential rings are structurally designed to be compatible with the tubing wall thickness and hardness of the material in order that the tubing when swaged becomes deformed by indentation bending about the lands of the sleeve and expand or bulge outwardly into the grooves. As is clearly shown in FIGS. 1, and 2, the spaced series of circumferential lands and grooves each have a longitudinal width equal to several times the thickness of the walls of the tubes 10 and 11, and form a square front tooth cross section in the plane parallel to the longitudinal axis of the tubing shown in FIGS. 1 and 2. As can be seen in FIG. 2, when the union is fully installed, both the inner and outer surfaces of the walls of the tubes are deformed in bending by action of the lands in permanently reducing the local wall diameter under each of the lands by an equal amount which, as can be seen is of the order of the thickness of the walls themselves. It will also be noted in FIG. 2 that the tube walls are bent outwardly into the regions occupied by the grooves such that a series of ring joints involving indentations and convolutions are formed. In this manner, the internal pressure in the tubing aids in tightening up the series of ring joints and increases the tensile strength of the union. The generally known tube fittings have serrations that will not properly bend or deform the tubing to produce the desired spaced series of ring pressure joints because the tooth-like serrations either cut into the material causing a high stress concentration at the point of the tooth causing the tubing to fracture, or due to the surface hardness of the tubing the teeth of the serrations are broken off and the joint is then not capable of carrying the tensile load of the high pressure system.

What is claimed is:

1. A screw-together tubing union assembly for coupling the ends of a pair of thin walled tubes constructed of lightweight high strength materials of the type used in the aircraft industry comprising:

a pair of tubes having their ends butted together in tight nesting engagement; a sleeve positioned centrally over said tube ends and having an internal surface containing a spaced series of circumferential lands and grooves each having a longitudinal width of a dimension equal to several times the thickness of the walls of said tubes and defining a square front tooth cross section in a plane parallel to the longitudinal axis of said tubing, the external surface of said sleeve having a central portion of enlarged diameter and a pair of tapered external surfaces decreasing in diameter from a maximum near said central portion to a minimum at opposite ends of said sleeve; a housing which entirely surrounds the central portion of said sleeve and has internal threads at one longitudinal end and an internal shoulder at the other end, said housing being additionally provided with an external wrenching surface;

a swaging collar positioned in abutment relation with said internal shoulder of said housing and having a tapered inner surface for complementary engagement with one of the tapered surfaces of said sleeve; an insert, externally threaded for engagement with said internal threads of said housing and having a tapered inner surface for complementary engagement with the other of said tapered surfaces of said sleeve, said insert also being provided with an external wrenching surface; wherein upon tightening of said assembly by torsion forces applied and reacted at said wrenching surfaces the sleeve is radially compressed inwardly to deform both the inner and outer surfaces of the walls of said tubes in bending by action of the lands of said sleeve in permanently reducing the diameter of the walls of said tubing adjacent said lands by an equal amount which is of the order of the thickness of said walls, and the walls of said tubes are bent outwardly into the regions occupied by said grooves such that the tubes are formed into a series of ring joints involving indentations and convolutions corresponding to said lands and grooves to thereby effect a permanent union of said tube ends such that internal pressure within said tubing will aid in tightening and securing the ring joints within the grooves to enhance the tensile strength of said union.

* * * * *